(No Model.)
J. STEPHENSON.
ELECTRIC CAR TRUCK FRAME.
No. 424,373. Patented Mar. 25, 1890.
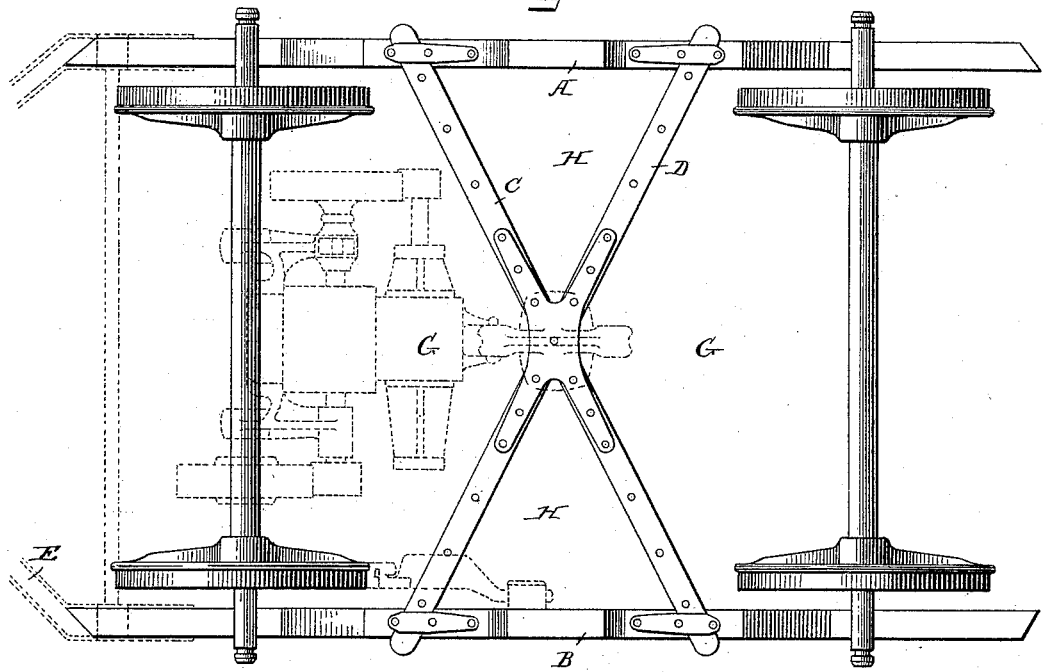
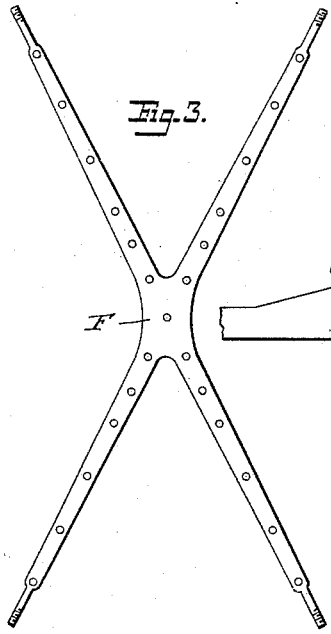
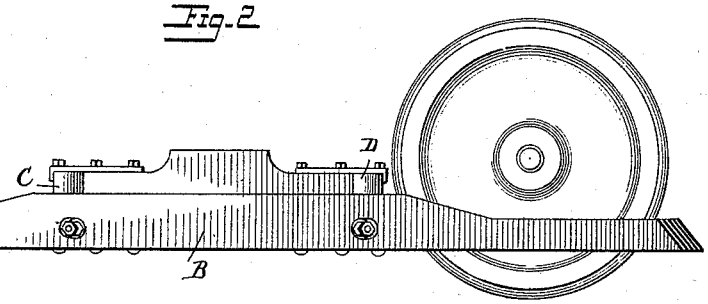
Witnesses
Jno. G. Hinkel
Georgia P. Kramer
Inventor
John Stephenson,
By his Attorneys
Foster Freeman

UNITED STATES PATENT OFFICE.

JOHN STEPHENSON, OF NEW YORK, N. Y.

ELECTRIC-CAR-TRUCK FRAME.

SPECIFICATION forming part of Letters Patent No. 424,373, dated March 25, 1890.

Application filed January 16, 1890. Serial No. 337,069. (No model.)

*To all whom it may concern:*

Be it known that I, JOHN STEPHENSON, a citizen of the United States, residing at New York, in the county and State of New York, have invented certain new and useful Improvements in Electric-Car-Truck Frames, of which the following is a specification.

My invention is an electric-car-truck frame in which the truck has two sills and two cross-rails crossing each other at a place central to the wheel-base. A car-truck frame so constructed is especially advantageous, in that such a truck will maintain its form and sustain the relative positions of the mechanism attached to the truck; because such form of truck best utilizes the area within the wheels and axles, leaving the entire space between the axles and wheels free for motor use; because the cross-rails of the truck are compressed into the smallest compass at the truck center, and there afford the best possible support for the noses of the motors with convenience for speedy detachment; because between the spread ends of the cross-rails is space most suitable for the wheel and truck brake mechanisms, and because the continuous rails from side to side of the truck and in diagonal positions constitute an unflinching form not otherwise attained. An electric motor-truck of rectangular construction becomes loose in the joints, tending to early disability and destruction. The truck-frame presented being a combination of triangles, cannot change form, and therefore the integrity of the connection is not violated, and proper spaces are afforded for the motors whose noses approximate near each other at the center of the truck, where they need support, and for the wheel-brakes, track-brakes, and other attachments to the truck-frame.

In the accompanying drawings I have illustrated the most approved form of my present invention, in which—

Figure 1 is a plan view of the electric-car-truck frame. Fig. 2 is a side view thereof, and Fig. 3 is a plan view of the spider-plate for the cross-rails.

The truck-frame is made of four pieces—two sills A B and two cross-sills C D. In constructing the frames for use the sills are placed parallel at a distance controlled by the gage of the track and length of the axle, and the sills are preferably supported under the axle-journals by any suitable construction. The X cross-rails C D have their ends spread and framed into the sills A B, respectively, as near to the car-wheels as will give proper room for the brake-shoes of the wheels.

If a track-guard is used, the sills should have a length beyond the axle-boxes sufficient for the attachment of the track-guards E.

To re-enforce the strength of the truck the cross-rails C D have a spider-plate F of substantially the shape of the cross-rails, secured to their under sides, the limbs of the spider-plate terminating, preferably, in screw bolts passing through the sills A B and secured with screw-nuts on the bolt terminals outside the sills, by which spider plate the frame is drawn tightly together and prevented from loosening in the joints or changing form. This truck thus constructed furnishes spaces G G on either side for one or two electric motors, as desired, the noses of which can be supported upon the center of the cross-frame, and forms also triangular wells H H at either side, suitable to support the wheel-brake, track-brake, track-guards, wheel-chock, &c., which are preferably mounted upon a car by the truck-frame.

What I claim is—

1. A car-truck frame having two sills connected by two cross-rails crossing each other at their middle, substantially as described.

2. A car-truck frame having its two sills connected by two cross-rails crossing each other at or near the centers of their lengths, the sills being extended suitably for suspension beneath the car-axle terminals, substantially as described.

3. A car-truck frame having its two sills connected by two diagonal cross-rails, the opposing ends of each cross-rail being united with the sills near the car-wheels suitably for carrying the brake-shoe bar, substantially as described.

4. A car-truck frame having its two cross-rails crossing each other at a point central to the wheel-base, with the ends of the sills passing under and beyond the car-axle terminals sufficiently to receive the track-guards, substantially as described.

5. A car-truck frame with two sills connected by two diagonal cross-rails interlocked at a point about central to the wheel-base and suitable to receive any proper device for holding the nose of the motor, substantially as described.

6. A car-truck frame with two sills connected by two rails crossing each other near their centers, the ends of the rails spreading and uniting with the sills, thereby forming at each side of the car-truck frame a triangular space or well suitable for holding brake mechanism adapted to the spaces, substantially as described.

7. A car-truck frame having two sills forming sides of the frame and two continuous diagonal rails crossing each other at their centers, the cross-rails being re-enforced by a spider-plate with its limbs terminating in screws with nuts on the outer faces of the sills, substantially as described.

8. A car-truck frame having two sills and two cross-rails forming at each side of the truck a triangular space, the three walls making an inclosure suitable for holding car-brake mechanism, substantially as described.

In testimony whereof I have signed my name to this specification in the presence of two subscribing witnesses.

JOHN STEPHENSON.

Witnesses:
JOSEPH B. STEPHENSON,
S. A. STEPHENSON.